Dec. 18, 1923.
B. F. SEYMOUR
1,477,912
RESILIENT TRANSMISSION AND BEARING
Filed Oct. 13, 1919  2 Sheets-Sheet 1
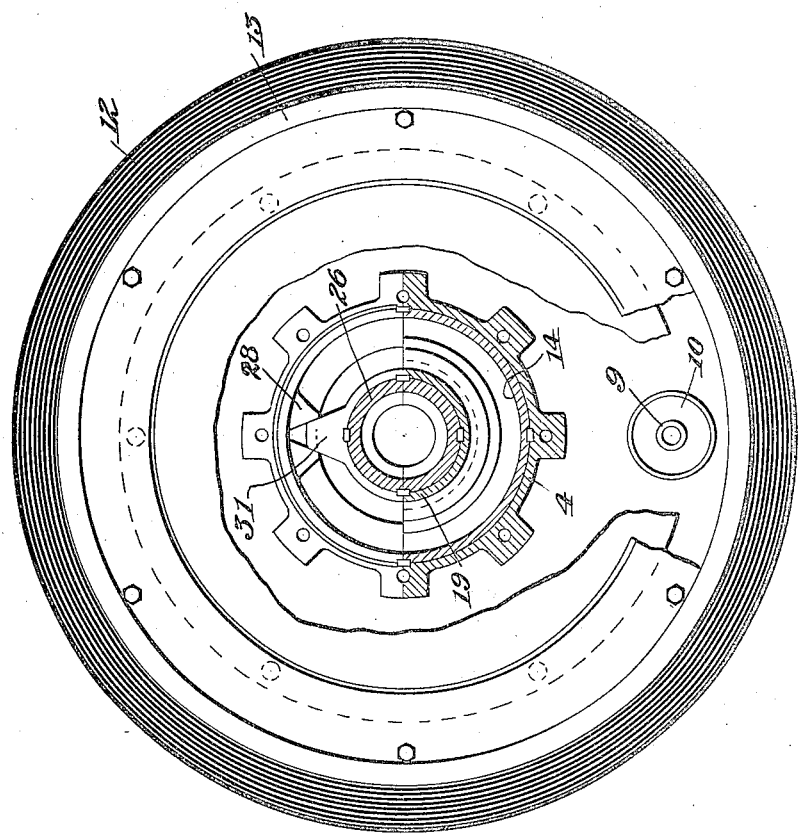
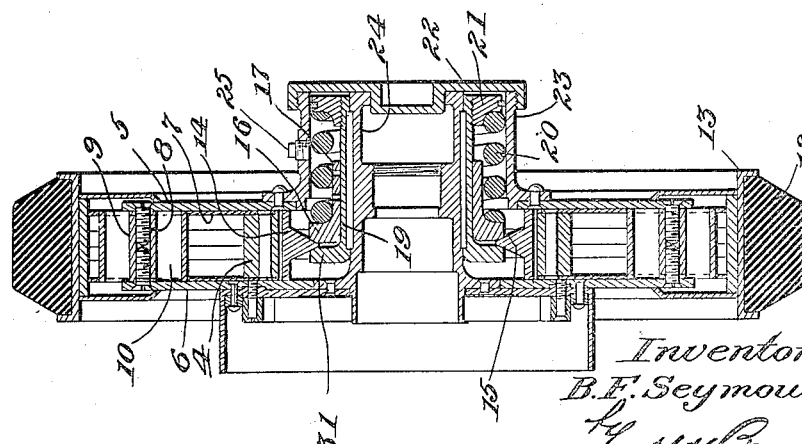
Inventor:
B. F. Seymour,
Atty.

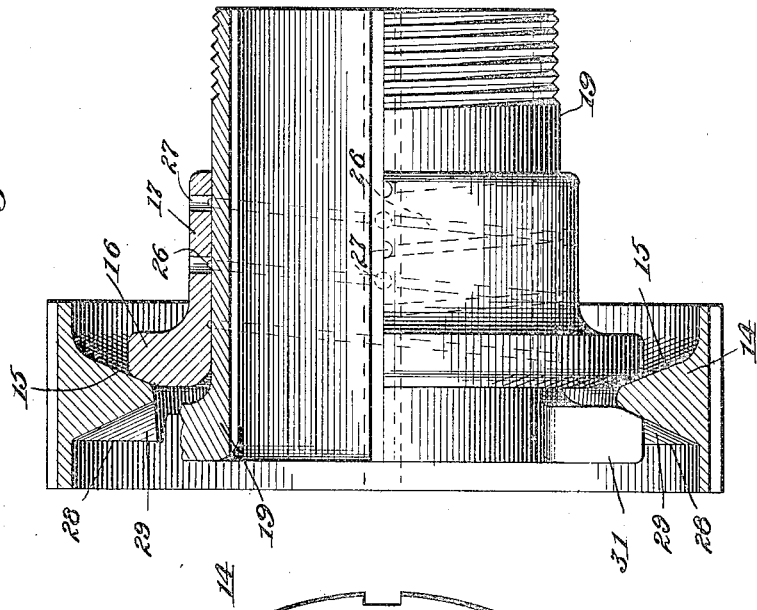
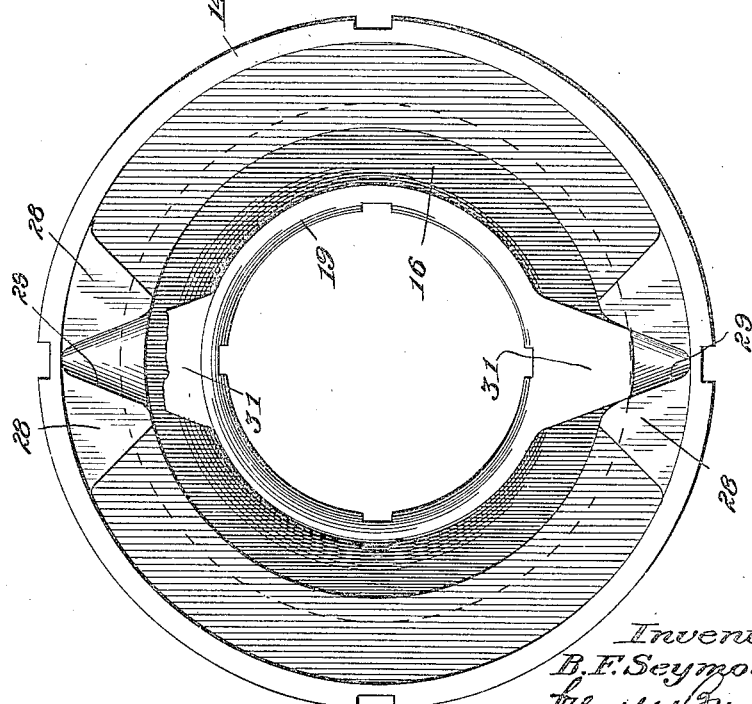

Patented Dec. 18, 1923.

1,477,912

UNITED STATES PATENT OFFICE.

BENJAMIN F. SEYMOUR, OF WASHINGTON, DISTRICT OF COLUMBIA.

RESILIENT TRANSMISSION AND BEARING.

Application filed October 13, 1919. Serial No. 330,374.

*To all whom it may concern:*

Be it known that I, BENJAMIN F. SEYMOUR, a citizen of the United States, residing at Washington, in the District of Columbia, have invented certain new and useful Improvements in Resilient Transmissions and Bearings; and I do hereby declare the following to be a full, clear, and exact description of the invention such as will enable others skilled in the art to which it appertains to make and use the same.

The present invention relates to resilient drives and bearings, more particularly for vehicle wheels, and consists in the combinations and arrangements of elements hereinafter described and particularly set forth in the accompanying claims.

The purpose of the invention is to provide a flexible or resilient drive between a driving and a driven element adapted to positively transmit the driving force whether said elements are in or out of concentric relation; and one which will readily accommodate itself under all normal working conditions to which said elements may be subjected.

A further purpose of the invention is to provide a combined resilient drive and bearing for a vehicle wheel to the end that such a wheel may possess the desired resilient qualities and also give the necessary transmission medium between the wheel proper and the motive power of the vehicle.

The arrangement shown herein is further characterized in that uniformly distributed and co-operable cone elements are provided for the driving and driven members to the end of obtaining equal and uniformly distributed pressure under all working conditions, whereby to obtain maximum efficiency and ease of operation.

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section, of the transmitting and bearing elements per se, and Figure 4 is a similar view thereof taken at right angles to Figure 3.

Referring to the construction in further detail and wherein like reference characters designate corresponding parts, the construction consists of a hub portion formed of two side plates, or housing members 5 and 6 which are disposed against the discs forming the inner rim portion 7 of the wheel, as shown. The two hub members 5 and 6 are secured to the wheel rim by the series of pairs of screw bolts 8 threaded into sleeves 9 that serve as spacing elements and which are located within the spaces, or chambers, 10, formed in the outer portion of the wheel rim, as indicated in Figures 1 and 2. It will be understood of course that said spaces 10 are provided to allow the wheel rim to have limited radial movement with respect to the hub of the wheel. A suitable tire 12 is mounted on the flanged rim 13.

The resilient bearing device per se consists of a ring 14 on the wheel rim portion 4 that is secured to the discs 7 by bolts passing through the annular series of radially projecting lugs. (See Fig. 2.) Said rim portion 4 is constructed with an annular wedge element 15 which is adapted to co-act with the cone head 16 of a sleeve 17. The sleeve 17 is mounted to have limited lateral movement on the sleeve 19 against the tension of the spring 20 whose respective ends abut the head 16 of the sleeve 17 and the nut 21 adjustable on the sleeve member 19.

In order to change the degree of compression of the spring 20 against the cone portions 16, there is a removable cap 22, screw-threaded on the hub flange 23. It will thus be seen that it is necessary only to remove said cap 22 for giving access to adjust the nut 21 the amount desired for regulating the tension on the spring 20. The space between the hub 24 and hub flange 23 is adapted to contain a suitable lubricant that is applied through the opening normally closed by the plug 25; and to provide for proper lubrication between the working sleeves 17 and 19 there is formed a spiral groove 26 on the inner face of sleeve 17. Lubrication is admitted through the several apertures 27 uniformly spaced around the circumference of said sleeve 17.

The resilient drive or transmission per se is provided by two pairs of diametrically opposed shoulders 28 formed on one side of the ring 14 and providing abutments 29 that cooperate with complemental abutments formed on the two diametrically opposed and radial projections 31 on the sleeve 19 (see Figures 3 and 4).

In operation a diagonal pair of abutments on the members 31 will co-act with the corresponding abutments of shoulders 29 on the members 28 for transmitting motion to the wheel rim from the driven element 19; and this transmission is rendered resilient and commensurate with the load and power applied through the agency of the spring 20 that acts to hold the driving and driven elements under resilient tension as disclosed.

It will therefore be seen from the foregoing that both the resilient bearing and resilient driving elements possess one and the same means for accomplishing their respective functions (to wit, spring 20), and it will be further evident that any motion or shock to the vehicle wheel will be taken up by the resilient means and axially of the wheel.

It will be obvious, of course, that different forms of constructions may be provided in lieu of that disclosed and described herein. And while I have shown and described certain apparatus for accomplishing the result initially stated it is to be understood that I am not limited to the precise details shown but may on the other hand adopt modifications or changes within the scope of the claims as will better suit the end in view.

What I claim as new and desire to protect by United States Letters Patent is:

1. In a combined resilient bearing and drive for vehicle wheels the combination of a hub member, a wheel rim mounted to have limited radial movement thereon, a bearing sleeve and a driving and bearing sleeve mounted for opposed axial movements on said hub, said sleeve elements mounted on opposite sides of the wheel rim, said wheel rim and driving sleeve having co-acting driving and bearing elements, and resilient means normally holding said sleeves in engagement with the rim, substantially as set forth.

2. In a combined resilient bearing and drive for vehicle wheels the combination of a hub member, a wheel rim mounted for radial movement on the hub member, said rim having a centrally disposed middle portion constructed to provide a cone bearing element and a driving element in opposed relation, a cone element mounted on the hub in bearing relation to the cone element on the rim, a second element mounted on the hub having bearing and driving relation with said rim driving element, and a resilient medium cooperable with said bearing and driving elements, substantially as set forth.

3. In a combined resilient bearing and drive for vehicle wheels the combination of a hub member, a wheel rim mounted to have limited radial movement on the hub member, said rim having an annular wedge portion and abutments on opposite sides thereof, a cone bearing member axially movable on the hub and engaging with said wedge portion, a bearing and driving member axially movable on the hub and co-operable with said abutments, and a resilient medium cooperable with said bearing and driving members, substantially as set forth.

4. In a combined resilient bearing and drive for vehicle wheels the combination of a hub member, a wheel rim mounted to have limited radial movement on the hub member, said rim having an annular wedge element on one side and abutments on the opposite side thereof, a cone bearing member axially movable on the hub and engaging with said wedge element, a bearing and driving member axially movable on the hub and engaging with said abutments, and a resilient device co-operable with said bearing and driving members, substantially as set forth.

5. In a resilient bearing and drive for vehicle wheels the combination of a hub member, a rim member mounted to have limited radial movement on said hub member, said rim having an annular wedge element on one side and a pair of diametrically disposed cam abutments on the opposite side thereof, telescopical sleeves mounted to move axially on the hub member, one of said sleeves having a cone head engaging with said annular wedge element, the other sleeve formed with radial projections having driving and bearing engagement with the cam abutments on said rim, a resilient member co-operable with said sleeves, and means for regulating the tension of said resilient member, substantially as set forth.

In testimony whereof I affix my signature.

BENJAMIN F. SEYMOUR.